Dec. 14, 1937. W. W. SLOANE Re. 20,589
DRIVE MECHANISM FOR SHAKER CONVEYERS
Original Filed Nov. 28, 1932 3 Sheets-Sheet 1
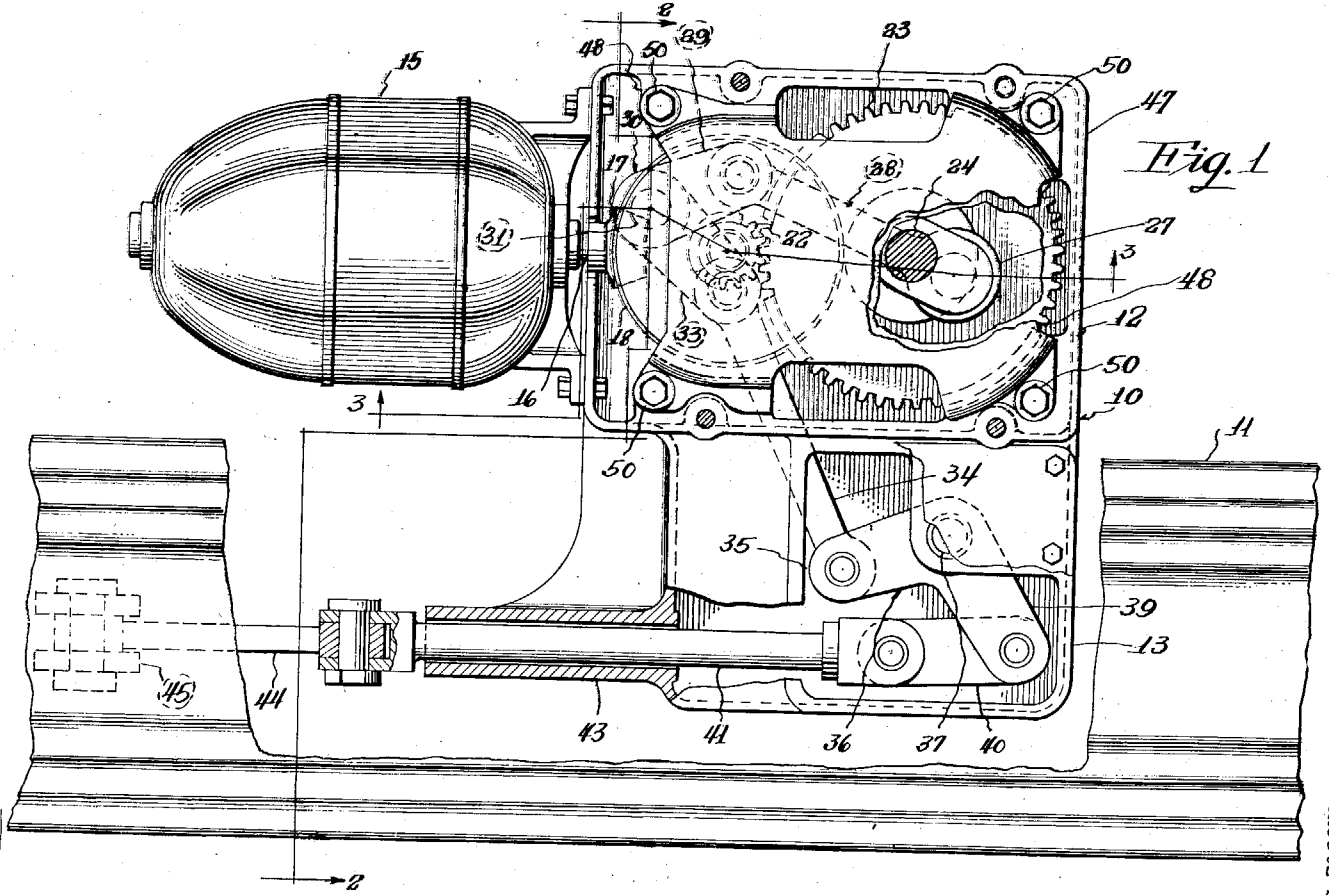
Inventor
William W. Sloane
Clarence F. Poole
Attorney Dec. 14, 1937. W. W. SLOANE Re. 20,589
DRIVE MECHANISM FOR SHAKER CONVEYERS
Original Filed Nov. 28, 1932 3 Sheets-Sheet 2
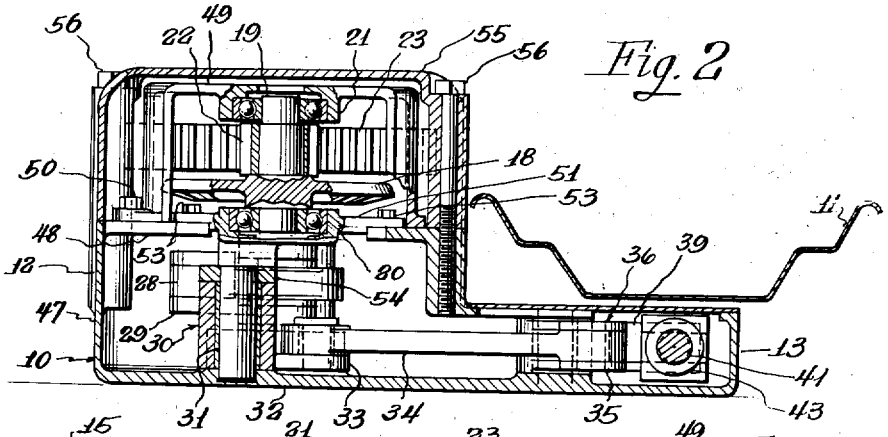
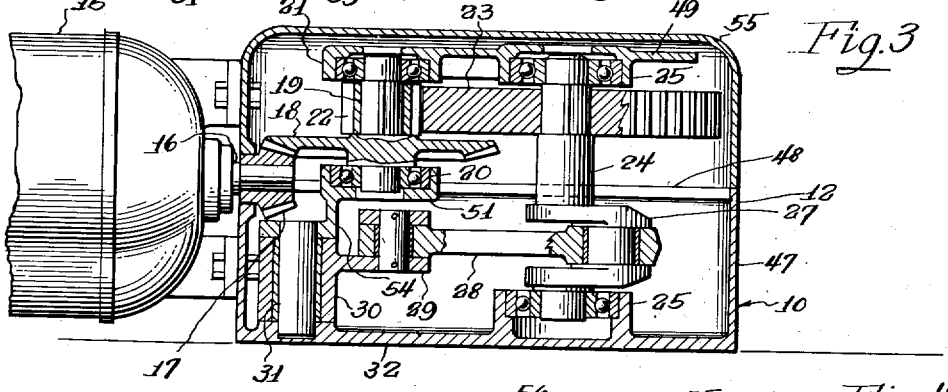
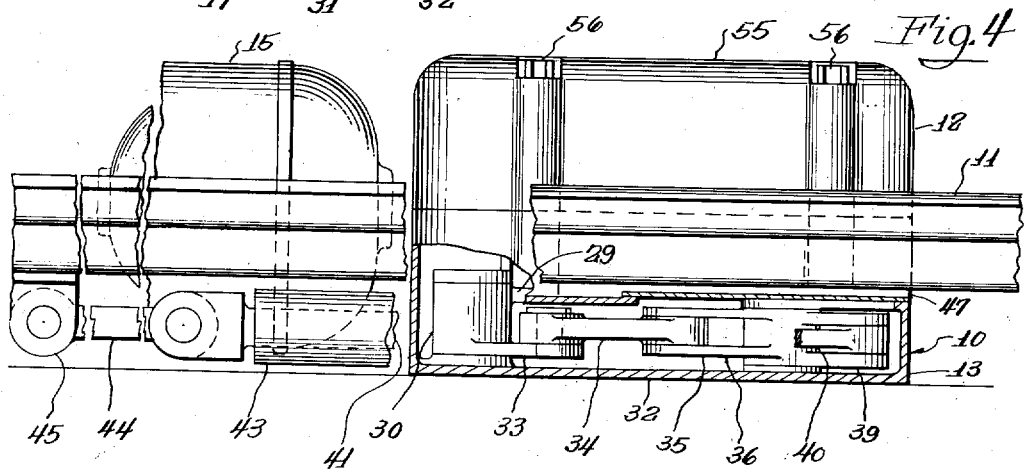
Inventor
William W. Sloane
Clarence F. Poole
Attorney Dec. 14, 1937. W. W. SLOANE Re. 20,589

DRIVE MECHANISM FOR SHAKER CONVEYERS

Original Filed Nov. 28, 1932 3 Sheets-Sheet 3

Inventor
William W. Sloane
Clarence F. Poole
Attorney

Reissued Dec. 14, 1937

Re. 20,589

UNITED STATES PATENT OFFICE 20,589

DRIVE MECHANISM FOR SHAKER CONVEYERS

William W. Sloane, Chicago, Ill., assignor to Goodman Manufacturing Company, Chicago, Ill., a corporation of Illinois Original No. 2,026,103, dated December 31, 1935, Serial No. 644,666, November 28, 1932. Renewed June 3, 1935. Application for reissue November 1, 1937, Serial No. 172,296

19 Claims. (Cl. 198—220)

This invention relates to improvements in drive mechanisms for shaker conveyers of the type utilized for conveying loose material, such as coal.

Among the objects of the invention are to provide an improved construction and arrangement of the shaker drive whereby minimum head space or vertical clearance is required, and wherein a portion of the intermediate drive mechanism extends beneath the shaker trough, and reciprocating motion may be transmitted to the shaker trough in a vertical plane including the longitudinal axis of said trough.

A further and important object of my invention is to provide an improved mechanical movement for drive mechanisms of the character described, whereby a plurality of power transmitting devices are interposed between the drive motor and the trough, and arranged to transpose the rotary motion produced by the motor into a rectilinear motion having predetermined changes in acceleration during various parts of its stroke so as to produce a most efficient jigging action for moving loose material in one direction along the conveyer trough. As will hereinafter more fully appear, my improved form of mechanical motion is based primarily upon certain novel principles of arrangement and relationship of bell crank members and connecting links, which principles are capable of application in a wide variety of forms not necessarily limited to the specific form of shaker trough illustrated herein.

In the design of shaker conveyer driving mechanism, it is often possible to increase the movement of the material along the pan line by increasing the maximum forces that are applied to the pan line and to the various parts of the driving mechanism. It is, of course, desirable that the material be moved as rapidly as possible and at the same time the stresses be kept to a minimum. Accordingly, another of the principal objects of my invention is to provide a drive mechanism of the character described which will move material faster than other drive mechanisms in proportion to the stresses created.

The invention may best be understood by reference to the accompanying drawings in which:

Figure 1 is a top plan view of one embodiment of my invention with parts of the shaker trough and gear case cover removed, and parts broken away to show certain features of construction of the main operating parts;

Figure 2 is a transverse section taken along line 2—2 of Figure 1;

Figure 3 is a longitudinal section taken along line 3—3 of Figure 1;

Figure 4 is a fragmentary side view of the mechanism shown in Figure 1, with parts broken away and in section to show a portion of the link arrangement;

Figure 5:
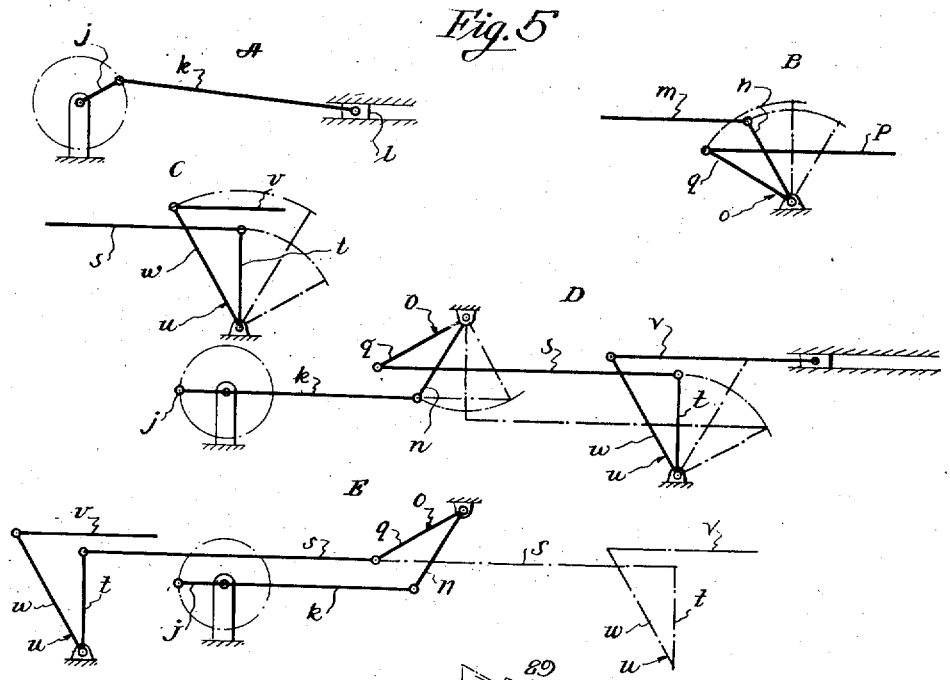
Figure 5 is a view showing diagrams illustrating the development of the power linkage embodying the principle of my improved form of mechanical movement.

Referring now to the details of the embodiment of my invention illustrated in the drawings, and relating particularly to the details of construction wherein an especially compact and simple shaker drive is provided and overhead clearance is reduced to a minimum, my improved form of drive consists of a casing 10 which is adapted to rest on the mine floor and be suitably secured thereto when in operation by holding jacks (not shown) or the like in the usual manner. The casing 10 consists of a main housing 12 adapted to be positioned at one side of a conveyer trough 11 and having a reduced laterally extending portion 13 adapted to extend beneath said trough and beyond the center line thereof, as clearly shown in Figures 1 and 2.

A motor 15 is mounted on one of the walls of the drive casing. The motor 15 may be of any type, but in the form shown an electric motor is employed having an armature shaft 16 and drive pinion 17 thereon meshed with a gear 18 herein rotatable upon a vertically disposed shaft 19 supported at its upper and lower ends in anti-friction bearing supports 20 and 21, respectively. A pinion 22 is keyed on the shaft 19 and drives a spur gear 23 on an upright crank shaft 24 having anti-friction bearing supports 25, 25 at the upper and lower ends thereof, as shown.

The crank shaft 24 has a crank arm 27 to which is connected a horizontally disposed connecting rod 28 having its opposite end pivoted on a lever arm 29 forming part of a bell crank member 30.

The bell crank member 30 is pivoted on an upright pin 31 suitably supported adjacent a base plate 32 of the casing 10. A second arm 33 of the bell crank member 30 is slightly longer than the first mentioned arm 29, and extends from the pivotal axis of said bell crank member in a direction at a substantial angle from said first mentioned arm but extending generally toward the side where the trough is mounted.

A second connecting link 34 is pivoted on the end of the lever arm 33 and extends horizontally into the reduced extension of the casing 10 beneath the trough 11 where it is connected to an arm 35 of a second bell crank member 36. This second bell crank member 36 is pivoted on a pin 37.

It will be especially noted, as one of the features of my improved form of mechanical movement, that the axis of the first bell crank member 30 is disposed at one side of the extended axis of the second connecting link 34, while the axis of rotation of the second bell crank member 36 is disposed on the opposite side of the extended axis of said second connecting link. The purpose of this particular construction will hereinafter more fully appear in the detail discussion of the mechanical movement and its various modifications.

A second arm 39 of the second bell crank member 36 extends at a substantial angle to its companion arm and toward the center line of the trough. The second arm 39 of the second bell crank member 36 is connected at its free end to a double hinged link 40, which in turn is pivotally connected to a plunger 41 extending through an elongated guide bearing 43 disposed in a horizontal axis but in a vertical plane which also includes the longitudinal axis of the trough 11. The trough 11 is finally connected to the outer end of the plunger 41 by means of a double hinged link 44 having connection with a suitable bracket 45 mounted on the undersurface of said trough, as shown in Figures 1 and 4.

As a preferred feature of construction to provide ready accessibility to the operating parts within the casing 10, it will be observed that I split said casing upon a horizontal line intersecting the axis of the driving motor where its armature shaft 16 extends into said casing, as clearly shown in Figure 3. A bottom part 47 of the casing 10 has a plurality of inwardly extending flange supports 48, 48 at opposite sides thereof, upon which are mounted an upwardly arched bracket 49 which carries the upper bearing supports 21 and 25 of the shaft 19 and the crank shaft 24, respectively. The upwardly arched bracket 49 is suitably secured to the supporting flanges 48 as by bolts 50, 50.

I also provide a detachable bridge member 51 secured to the supporting flanges 48 between the vertical walls of the upwardly arched bracket 49 and secured by bolts 53, 53, as shown in Figure 2. The bridge member 51 carries the lower bearing support 20 of the upright shaft 19, and also has a downwardly extending portion 54 which forms the upper bearing support for the upright pin 31 which carries the bell crank member 30. An upper part or cover 55 of the casing 10 is detachably connected to the bottom part 47 by cap screws 56, 56.

With the construction described, it will be observed that after the cover 55 is removed, the upwardly arched bracket 49 may be bodily removed with its bearing supports 21 and 25, and the bridge member 51 may then be removed in a similar manner so as to permit removal of all of the operating parts contained within the main part of the casing 10.

Figure 6:
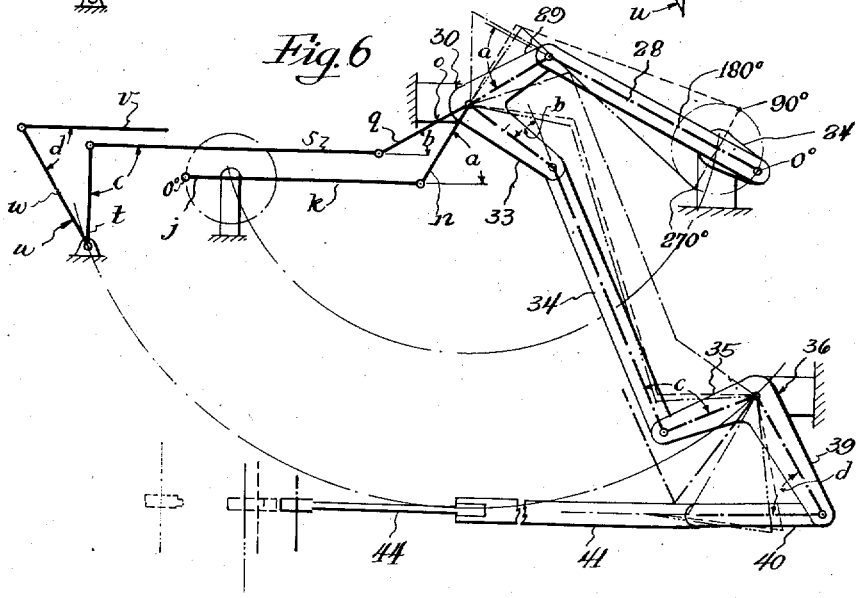
Figure 6 is a diagrammatic view of the power linkage embodying the principle of my improved form of mechanical movement, with the parts arranged as in the shaking mechanism shown in Figure 1.

Referring now more particularly to the novel form and advantages of the specific arrangement of power transmission mechanism, the linkage employed in the embodiment illustrated in Figures 1, 2, 3, and 4 is shown in diagrammatic form in Figures 5 and 6. It should be understood that in order to efficiently move coal or material along the conveyer trough 11, the driving mechanism must impart to said conveyer trough a forward stroke gradually accelerated for a greater part of its length, and rapidly decelerated for the remainder of its length; and a back stroke correspondingly but reversely rapidly accelerated for a relatively short portion of its length and gradually decelerated for the remainder of its length. It should further be understood that it is desirable that the acceleration in the forward stroke, and the combined deceleration in the forward stroke and acceleration in the return stroke, be as uniform as possible in order to get the greatest coal movement in proportion to the maximum accelerating force, it being understood that where the rates of acceleration and deceleration are uniform, the forces of acceleration and deceleration will be uniform.

When the conveyer pan line is on a relatively level plane, in order that material may be moved along said conveyer pan line, it is necessary that the force of acceleration per unit of weight on the forward stroke be less than the force of deceleration per unit of weight at the other end of the forward stroke and the force of acceleration on the start of the return stroke. It is further desirable that the coefficient of friction of the material to be moved lie somewhere between the values of these unit forces or a little less than the lesser force.

Furthermore, in order that a driving mechanism may be capable of handling material, the coefficient of friction of which may vary from time to time, and in order that movement of the material be not too greatly affected by moderate changes in speed of the drive motor or by different grades in different portions of the pan line, it is desirable that the difference between the forces of acceleration on the forward stroke and the forces of deceleration at the other end of the forward stroke and the forces of acceleration at the start of the return stroke be sufficient that the lower unit force; that is, the force of acceleration of the forward stroke be below the coefficient of friction of the material, and the maximum force; that is, the force of deceleration at the other end of the forward stroke and the force of acceleration at the start of the return stroke be above the coefficient of friction of the material in whatever combinations of varying coefficient of friction of the material, variations in speed of the drive motor and variations in grade in the pan line may occur.

With reference now in particular to Figure 5, diagrams A, B, C, D, and E illustrate several forms and combinations of mechanisms for reciprocating a conveyer trough and moving material therealong. Diagram A shows a simple crank *j* and connecting rod *k* connected to a cross-head *l*. This mechanism will impart a reciprocatory conveying action to a conveyer trough for moving material therealong. The shorter the connecting rod *k*, the greater will be the difference between the average forces at the two ends of the stroke; and the longer the connecting rod *k*, the smaller the difference between these forces will be. One of the chief disadvantages to such a motion, however, is that if this mechanism is proportioned to give a wide difference between the forces at the two ends of the stroke, each of these forces becomes non-uniform to an undesirable degree, especially the lesser forces.

Another mechanism commonly used for imparting a conveying action to a conveyer trough for moving material therealong is illustrated by Diagram B of Figure 5. In this diagram, a connecting rod *m* is driven by a suitable crank (not shown) in the same manner the connecting rod *k* in Diagram A, is driven by the crank *j*. In order that the moving effect of the mechanism may be studied independently of any moving action it may receive from the connecting rod driving the mechanism, the connecting rod *m* has been considered to be of infinite length. The connecting rod *m* is connected to one lever arm *n* of a bell crank member *o* and moves this lever arm of said bell crank member through equal angles from a line extending through the center of oscillation of said bell crank member and substantially perpendicular to said connecting rod. A connecting link *p* is connected to another lever arm *q* of the bell crank member *o*, which lever arm moves to one side of a line extending through the axis of pivotal movement of said bell crank member and substantially at right angles to the average position of said connecting link.

It being considered that the lengths of the connecting rod *m* and connecting link *p* are such that their angular motion is negligible, the study of the mechanism shown in Diagram B has demonstrated that the greater the angle through which the lever arm *q* is moved to one side of a line drawn through the center of oscillation of the bell crank member *o* and perpendicular to the average position of the connecting link *p* within workable limits, the greater will be the difference between the forces of acceleration and deceleration at the two ends of the stroke. The disadvantages of the mechanism shown in Diagram B, however, are the same as those in the mechanism shown in Diagram A; namely, that the forces become non-uniform when the mechanism is proportioned to give a wide difference between the forces at the two ends of the stroke.

When the mechanism shown in Diagram B is combined with the mechanism shown in Diagram A and the connecting rod connecting these two mechanisms together is relatively short, the characteristics of the resulting action are similar to those in Diagrams A and B and the proportion of the non-uniformity of the forces is not much altered for the same difference between the forces.

Considering now the mechanism shown in Diagram C, a connecting rod *s* is connected to one lever arm *t* of a bell crank member *u*. Considering the connecting rod *s* as being driven by a suitable crank and as being of infinite length so its angular movement is negligible, said connecting rod moves the lever arm *t* of the bell crank member *u* to one side of a radial line extending from the axis of pivotal movement of said bell crank member and substantially perpendicular to said connecting rod. A connecting link *v* is connected to another lever arm *w* of the bell crank member *u* and said lever arm and connecting link are moved through equal angles from a radial line extending through the axis of pivotal movement of the bell crank member *u* and substantially at right angles to said connecting link in its average position.

The shaking motion produced by the mechanism shown by Diagram C of Figure 5 is similar to that produced by the mechanism shown by Diagram B, with the exception that it is possible to obtain a greater difference between the forces at both ends of the stroke with the same degree of non-uniformity or to obtain the same difference between the forces at both ends of the stroke with a greater degree of uniformity. This is particularly true during the accelerating portion of the forward stroke.

It has been found that when the mechanism shown by Diagram C of Figure 5 is driven from a crank shaft by a connecting rod of a length comparable to the length of the connecting rod *k* in Diagram A, that the effect of the connecting rod angle on the resulting motion is such as to destroy the advantages of this mechanism over those shown in Diagrams A and B.

It is therefore apparent that of the three usual methods of driving shaking conveyers, that the most desirable is that shown by Diagram C when this mechanism is driven by a connecting rod having little or no angular motion.

Angularity of the connecting rod *s* is reduced by the addition of the mechanism shown by Diagram B to the mechanism shown by Diagram C and positioning said mechanisms with respect to each other and driving the connecting rod *s* from the bell crank member *o* in a manner which will hereinafter be more fully described.

Referring now in particular to Diagram D of Figure 5 in which the mechanisms shown by Diagrams A, B, and C have been combined, the connecting rod *k* and crank *j*, as well as the bell crank members *o* and *u*, each contribute to the difference between the forces at the two ends of the stroke. In order to obtain the greatest difference between the forces at the two ends of the stroke, it is necessary that the parts be so assembled with relation to each other that the higher forces of acceleration and deceleration of each unit occur at the same end of the stroke, and that the lower forces of acceleration and deceleration of each unit occur at the other end of the stroke. It is apparent that the greater forces of acceleration and deceleration of the bell crank members *o* and *u* must occur at the same time or else the effects of one will destroy the effect of the other, and in order that these forces may occur at the same time, and in order that angular motion of the connecting rod *s* may at the same time be reduced to a minimum, the pivotal axes of said bell crank members must be placed on opposite sides of the longitudinal axis of said connecting rod.

While it is possible to place both of the pivotal axes of the bell crank members *o* and *u* on the same side of the longitudinal axis of the connecting rod *s*, and in so doing reduce the angular motion of said connecting rod to zero, it has been found that with this arrangement the higher forces of each of said bell crank members will occur at opposite ends of the stroke and the effect of one will destroy the effect of the other.

It has been found that a combination of two or more elements, each producing a slight difference in accelerating forces, will give a final motion wherein the difference between the accelerating forces approximate the sum of those obtained from each of the elements and the material moving ability of the final motion will be superior in proportion to the maximum moving forces which might be obtained from any single unit so proportioned as to give the same difference between the two average forces.

The mechanisms shown by Diagrams A, B, and C have previously been combined into one conveyer drive unit in such a manner that the forces of acceleration occur at the same end of the stroke, but angular movement of the connecting rod connecting the two bell crank members together spoils the final conveying effect and while the final movement may be an improvement over that produced by any one single mechanism or combination of any two of these mechanisms, the final conveying effect is not one which has a maximum coal moving ability for the same maximum force.

In order to minimize angular movement of the connecting link *s* connecting the bell crank members *o* and *u* together, and in order to obtain the greater accelerating force for the two bell crank members at the same end of the stroke, the pivotal axes of said bell crank members have been arranged on opposite sides of the longitudinal axis of said connecting link in such a manner that the major portion of the arc through which the lever arm *q* of the bell crank member *o* moves is in a position clockwise from a line extending through the center of oscillation thereof and substantially perpendicular to the average position of said connecting link, while the major portion of the arc through which the lever arm *t* of the bell crank member *u* moves is in a position clockwise from a line extending through the center of oscillation of said second mentioned bell crank member and substantially perpendicular to an average position of said connecting link from said first mentioned lever arm of said first mentioned bell crank member.

While the drawings show the entire arc through which the lever arms *q* and *t* travel in a position clockwise from perpendicular lines passing through the centers of oscillation of the bell crank members *o* and *u*, and perpendicular to the average position of the connecting rod *s*, it should be understood that the entire portion of the arcs need not be so positioned as long as the major portion of the arcs is in a position clockwise from said aforementioned perpendicular lines. It should also be understood that the drive mechanism may be so arranged that the major portion of the arcs is in positions counter-clockwise from said aforementioned perpendicular lines without affecting the final drive action of the mechanism.

It may thus be seen that the element shown by Diagram C, when combined with the elements shown by Diagrams A and B, and when operated by a connecting rod having a minimum amount of angular motion, produces a more desirable final motion than has formerly been produced wherein a greater coal or material moving force is provided in proportion to the maximum accelerating force.

With reference to Diagram E of Figure 5, said diagram is inserted to illustrate the fact that the positions of the bell crank members *o* and *u* with respect to each other may be changed without materially changing the effect of the drive action as long as the axes of pivotal movement of the bell crank members *o* and *u* are on opposite sides of the longitudinal axis of the connecting link *s* connecting these bell crank members together; and as long as the same angular relation at both ends of the stroke between the lever arms *q* and *t* of the bell crank members *o* and *u*, respectively, and the longitudinal axis of the connecting rod *s* are maintained at both ends of the stroke.

In Diagram E, the bell crank member *u* has been moved on the opposite side of the crank *j* from the bell crank member *o* and the lever arms *q* and *t* have been connected together by the connecting rod *s*, whose longitudinal axis is between the axes of oscillation of said bell crank members. It may thus be seen that angular movement of the bell crank members *o* and *u* is substantially the same as in Diagram D and that the arrangement shown in Diagram E is of a more compact form than that shown in Diagram D, and while the angular relation between the lever arms *q* and *t* of the bell crank members *o* and *u* are the same with respect to the longitudinal axis of the connecting rod *s* at both ends of the stroke in Diagrams D and E, there will be a slight difference in their angular relations during the stroke. This difference is reduced as the length of the connecting rod *s* is increased but for any practical connecting rod length it does not result in any material change in the final motion.

Referring now to Figure 6 showing diagrammatically the arrangement of drive mechanism shown in Figures 1 to 4, inclusive, and the development thereof from the arrangement shown by solid lines in Diagram E of Figure 5, said drive arrangement is developed by first projecting the first lever arm *n* of the first bell crank member *o* together with the connecting rod *k* and crank *j* as a unit about the axis of pivotal movement of said bell crank member until said lever arm of said bell crank member and crank and connecting rod are positioned in the desired relationship. It should be noted that in the projected form the angle *a* between the first lever arm *n* of the first bell crank member *o* and the extended connecting rod *k* is the same as formerly. The second lever arm *q* of the first bell crank member *o*, together with the connecting rod *s* and second bell crank member *u*, are likewise projected about the axis of oscillation of the bell crank member *o* until positioned in the desired relationship. Here, again, the angle *b* between the second lever arm *q* of the first bell crank member *o* and the extended longitudinal axis of the connecting rod *s* is maintained and the angle *c* between the first lever arm *t* of the second bell crank member *u* and connecting rod *s* is maintained. When in such a position, the second lever arm *w* of the second bell crank member *u* is projected about the axis of pivotal connection of said bell crank member until the required position is reached. In this case the angle *d*, between the lever arm *w* and the driving member connected thereto, is maintained.

Thus *j* corresponds to the crank 24, *k* to the connecting rod 28, *n* to the first lever arm 29 of the bell crank member 30, *q* to the second lever arm 33 of said bell crank member, *t* to the first lever arm 35 of the second bell crank member 36, *w* to the second lever arm 39 of said bell crank member, and *v* to the double hinge link 40.

It may thus be seen that the angles between the lever arms of each bell crank member may be changed so as to have any desired relationship with respect to each other as long as the crank 24 and lever arms of the bell crank members 30 and 36 are so arranged that the same angular relation is maintained between said lever arms and the connecting rods connected thereto at both ends of the stroke so that the forces of acceleration and deceleration of the parts occur at the same time and angular movement of the connecting rod 34 is reduced to a minimum.

It may thus be seen that my invention provides a driving mechanism of a simple construction consisting of a combination of driving crank and connecting rods and bell crank members placed in such relation with respect to each other as to produce accelerated and retarded forward and backward strokes of reciprocating motion of a more efficient character than has formerly been provided, which mechanism is so arranged as to cause the acceleration of the forward stroke and deceleration of the forward stroke and acceleration of the rearward stroke to be as uniform as possible for any given ratio between the average forward and backward forces of acceleration and deceleration and thus provide a conveying mechanism which will move material along a pan line in the most efficient manner possible without imparting unduly heavy strains on the parts of the mechanism and that this mechanism is so constituted as to be capable of being arranged in various forms without impairing the efficiency of the device so as to be adapted for use in varying conditions and more particularly conditions where space is necessarily limited.

While I have herein shown and described one form of my invention, I do not wish to be limited to the precise details of construction or arrangement of parts herein shown and described, excepting as specifically limited in the appended claims.

I claim as my invention:

1. In a shaker conveyer operating mechanism, the combination with a reciprocably driven conveyer trough, of two devices reciprocably movable about fixed pivotal axes, mechanism connecting one of said devices to said conveyer trough and a connecting member connecting said devices together, the axes of pivotal movement of said devices being on opposite sides of the longitudinal axis of said connecting member and said devices being so arranged and proportioned with respect to each other that the motion of said connecting member from one end of the stroke to the other is a substantially parallel motion.

2. In a shaker conveyer operating mechanism, the combination with a reciprocably driven conveyer trough, of a casing, a rotatable driving member mounted within said casing, two rocking members mounted within said casing for movement about parallel pivotal axes, an operative connection between said rotatable member and one of said rocking members, a driving connection between said other rocking member and said conveyor trough for reciprocably driving said conveyer trough, and a connecting member for connecting said devices together, said rocking members being so proportioned and arranged with respect to said connecting member that their axes of pivotal movement are on opposite sides of the longitudinal center line of said connecting member and the motion of said connecting member from one end of the stroke to the other is a substantially parallel motion.

3. In a shaker conveyer operating mechanism, a reciprocably driven member, two bell crank members pivotally movable about parallel axes, a driving connection with one lever arm of one of said bell crank members for reciprocably driving said bell crank member, a connection between one lever arm of said other bell crank member and said reciprocably driven member, and a connecting member operatively connecting the other lever arms of said bell crank members together, said connecting member being arranged so that its extended longitudinal center line is between the axes of pivotal movement of said bell crank members, and said bell crank members being so arranged and proportioned with respect to each other that the motion of said connecting member from one end of the stroke to the other is a substantially parallel motion.

4. In a shaker conveyer operating mechanism, the combination with a reciprocably driven conveyer trough, of a casing, a rotatable driving member mounted within said casing, two bell crank members mounted within said casing, a connection between said rotatable driving member and one lever arm of one of said bell crank members for oscillating said bell crank member, a connection between one lever arm of said other bell crank member and said conveyer trough for reciprocably driving said conveyer trough, and an operative connection between the other lever arms of said bell crank members comprising a connecting member so disposed that its longitudinal center line is between the axes of pivotal movement of said bell crank members, said bell crank members being so arranged and proportioned with respect to each other that the motion of said connecting member from one end of the stroke to the other is a substantially parallel motion.

5. In a shaker conveyer operating mechanism, the combination with a reciprocably driven conveyer trough, a rotating crank, a rocking member, a connecting rod connecting said crank with said rocking member, the axis of pivotal connection of said connecting rod and rocking member oscillating at substantially equal angles to a radial line extending through the pivotal axis of said rocking member and substantially perpendicular to the longitudinal center line of said connecting member when said crank is in a dead center position, a second rocking member, means for operatively connecting said rocking member with said conveyer trough, and a connecting member connecting said rocking members together, said connecting member being so disposed that its longitudinal axis extends between the pivotal axes of said rocking members, and the axes of pivotal connection of said connecting members to said rocking members being such that they oscillate substantially to one side of extended radial lines passing through the centers of pivotal movement of said rocking members and substantially perpendicular to the average position of said connecting member.

6. A shaker conveyer drive comprising a crank arm, a driven member comprising a reciprocating conveyer trough, and means connectible with said crank arm for imparting accelerated and retarded backward and forward strokes of reciprocating motion to said driven member comprising a rocking member, a connecting member connecting said crank arm with said rocking member, the point of pivotal connection of said connecting member to said rocking member being so arranged with respect to the axis of pivotal movement of said rocking member that said point oscillates at equal angles to a radial line extending through the axis of said rocking member and perpendicular to the longitudinal center line of said connecting member when said crank is in a dead center position, another rocking member spaced from said first mentioned rocking member, a connecting member connecting said other rocking member to said driven member, the point of pivotal connection of said other rocking member to said connecting member being so arranged with respect to the axis of pivotal movement of said rocking member that it oscillates at equal angles to each side of a radial line extending through the axis of pivotal movement of said rocking member and perpendicular to an extended longitudinal axis of said driven member, and a connection between said rocking members comprising a connecting member connected to said rocking members at its ends, the points of connection of said connecting member to said rocking members being such that said points oscillate to one side of extended radial lines passing through the center of pivotal movement of said rocking members and perpendicular to the average position of said connecting member.

7. A shaker conveyer drive comprising a crank arm, a driven member comprising a reciprocating conveyer trough, and means connectible with said crank arm for imparting accelerated and retarded backward and forward strokes of reciprocating motion to said driven member comprising a rocking member, a connecting member connecting said crank arm with said rocking member, the point of pivotal connection of said connecting member to said rocking member being so arranged with respect to the axis of pivotal movement of said rocking member that said point oscillates at equal angles to a radial line extending through the axis of said rocking member and perpendicular to the longitudinal center line of said connecting member when said crank is in a dead center position, another rocking member spaced from said first mentioned rocking member, a connecting member connecting said other rocking member to said driven member, the point of pivotal connection of said other rocking member to said connecting member being so arranged with respect to the axis of pivotal movement of said rocking member that it oscillates at equal angles to each side of a radial line extending through the axis of pivotal movement of said rocking member and perpendicular to an extended longitudinal axis of said driven member, and a connection between said rocking members comprising a connecting member connected to said rocking members at its ends, the points of connection of said connecting member to said rocking members being such that said points oscillate to one side of extended radial lines passing through the center of pivotal movement of said rocking members and perpendicular to the average position of said connecting member, and said connecting member being so arranged that the axes of pivotal movement of said rocking members are on opposite sides of its longitudinal center line.

8. In a shaker conveyer drive, a rotatable member, a driven member comprising a reciprocating conveyer trough, a rocking member, a connecting member for connecting said rocking member with said rotatable member, the point of connection of said connecting member to said rocking member being so arranged with respect to the axis of pivotal movement of said rocking member that said point may oscillate at equal angles to a radial line extending through the axis of said rocking member and perpendicular to the longitudinal center line of said connecting member when the point of connection of said rotatable member to said connecting member is in a dead center position, another rocking member spaced from said first mentioned rocking member and having connection with said driven member, and a connection between said rocking members comprising a connecting member connected to said rocking members at its ends, the points of connection of said connecting member to said rocking members being such that said points oscillate to one side of extended radial lines passing through the center of pivotal movement of said rocking members and perpendicular to the average position of said connecting member.

9. In a shaker conveyer drive, a rotatable member, a driven member comprising a reciprocating conveyer trough, a rocking member, a connecting member for connecting said rocking member with said rotatable member, the point of connection of said connecting member to said rocking member being so arranged with respect to the axis of pivotal movement of said rocking member that said point may oscillate at equal angles to a radial line extending through the axis of said rocking member and perpendicular to the longitudinal center line of said connecting member when the point of connection of said rotatable member to said connecting member is in a dead center position, another rocking member spaced from said first mentioned rocking member and having connection with said driven member, and a connection between said rocking members comprising a connecting member connected to said rocking members at its ends, the points of connection of said connecting member to said rocking members being such that said points oscillate to one side of extended radial lines passing through the center of pivotal movement of said rocking members and perpendicular to the average position of said connecting member, and said connecting member being so arranged that the axes of pivotal movement of said rocking members are on opposite sides of the longitudinal center line of said connecting member.

10. In a shaker conveyer drive, a rotatable crank, a driven member comprising a reciprocating trough, a bell crank member, a connecting link for connecting one arm of said bell crank member to said rotatable crank, said arm of said bell crank member being oscillatable at equal angles to a radial line extending through the axis of pivotal movement of said bell crank member and perpendicular to said connecting link when said rotatable crank is in a dead center position, another bell crank member spaced from said first mentioned bell crank member and oscillatable about an axis parallel to the axis of pivotal movement of said first mentioned bell crank member, a connection from one lever arm of said last mentioned bell crank member to said driven member and a connection from the other lever arm of said last mentioned bell crank member to the second lever arm of said first mentioned bell crank member, said connection being such and said bell crank members being so arranged that the lever arm of said last mentioned bell crank member having connection with said driven member oscillates at equal angles to a radial line extending through the axis of pivotal movement of said last mentioned bell crank member and perpendicular to the longitudinal center line of said driven member.

11. In a shaker conveyer drive, a rotatable crank, a driven member comprising a reciprocating conveyer trough, a bell crank member, a connecting link for connecting one arm of said bell crank member to said rotatable crank, said arm of said bell crank member being oscillatable at equal angles to a radial line extending through the axis of pivotal movement of said bell crank member and perpendicular to said connecting link when said rotatable crank is in a dead center position, another bell crank member spaced from said first mentioned bell crank member and oscillatable about an axis parallel to the axis of pivotal movement of said first mentioned bell crank member, a connection from one lever arm of said last mentioned bell crank member to said driven member and a connecting link connecting the other lever arm of said last mentioned bell crank member to the second lever arm of said first mentioned bell crank member, said second lever arm of said first mentioned bell crank member being so arranged with respect to said first lever arm of said bell crank member as to oscillate to one side of a radial line extending through the pivotal axis of said bell crank member and perpendicular to the average position of the longitudinal center line of said last mentioned connecting link, and said connecting link being so arranged as to be between the centers of oscillation of said bell crank members.

12. In a shaker conveyer drive, a rotatable crank, a driven member comprising a reciprocating conveyer trough, a bell crank member, a connecting link for connecting one arm of said bell crank member to said rotatable crank, said arm of said bell crank member being oscillatable at equal angles to a radial line extending through the axis of pivotal movement of said bell crank member and perpendicular to said connecting link when said rotatable crank is in a dead center position, another bell crank member spaced from said first mentioned bell crank member and oscillatable about an axis parallel to the axis of pivotal movement of said first mentioned bell crank member, a connection from one lever arm of said last mentioned bell crank member to said driven member and a connecting link connecting the other lever arm of said last mentioned bell crank member to the second lever arm of said first mentioned bell crank member, said last mentioned lever arms of said bell crank members being so arranged with respect to said first mentioned lever arms as to oscillate to one side of radial lines extending from the axes of oscillation of said bell crank members and perpendicular to the average longitudinal center line of said connecting link and said lever arm of said second bell crank member having connection with said driven member being so disposed with respect to said other lever arm as to oscillate at equal angles to a radial line perpendicular to the longitudinal center line of said driven member and extending through the axis of oscillation of said bell crank member.

13. In a shaker conveyer drive, a rotatable crank, a driven member comprising a reciprocating conveyer trough, a bell crank member, a connecting link for connecting one arm of said bell crank member to said rotatable crank, said arm of said bell crank member being oscillatable at equal angles to a radial line extending through the axis of pivotal movement of said bell crank member and perpendicular to said connecting link when said rotatable crank is in a dead center position, another bell crank member spaced from said first mentioned bell crank member and oscillatable about an axis parallel to the axis of pivotal movement of said first mentioned bell crank member, a connection from one lever arm of said last mentioned bell crank member to said driven member, a connecting link connecting the other lever arm of said last mentioned bell crank member to the second lever arm of said first mentioned bell crank member, said connecting link being so arranged as to be intermediate the axes of oscillation of said bell crank members so said first mentioned bell crank member may move said connecting link in a path in which its positions are substantially parallel at opposite ends of the stroke.

14. In a shaker conveyer drive, a rotatable crank, a driven member comprising a reciprocating conveyer trough, a bell crank member, a connecting link for connecting one arm of said bell crank member to said rotatable crank, said arm of said bell crank member being oscillatable at equal angles to a radial line extending through the axis of pivotal movement of said bell crank member and perpendicular to said connecting link when said rotatable crank is in a dead center position, another bell crank member spaced from said first mentioned bell crank member and oscillatable about an axis parallel to the axis of pivotal movement of said first mentioned bell crank member, a connection from one lever arm of said last mentioned bell crank member to said driven member, a connecting link connecting the other lever arm of said last mentioned bell crank member to the second lever arm of said first mentioned bell crank member, said last mentioned lever arms being so arranged with respect to said first mentioned lever arms as to oscillate to one side of radial lines extending from the axes of oscillation of said bell crank members and perpendicular to the average longitudinal center line of said connecting link, and said connecting link being so arranged as to be intermediate the axes of oscillation of said bell crank members.

15. In a shaker conveyer drive, a rotatable crank, a driven member comprising a reciprocating conveyer trough, a bell crank member, a connecting link for connecting one arm of said bell crank member to said rotatable crank, said arm of said bell crank member being oscillatable at equal angles to a radial line extending through the axis of pivotal movement of said bell crank member and perpendicular to said connecting link when said rotatable crank is in a dead center position, another bell crank member spaced from said first mentioned bell crank member and oscillatable about an axis parallel to the axis of pivotal movement of said first mentioned bell crank member, a connection from one lever arm of said last mentioned bell crank member to said driven member, a connecting link connecting the other lever arm of said last mentioned bell crank member to the second lever arm of said first mentioned bell crank member, said last mentioned lever arms being so arranged with respect to said first mentioned lever arms as to oscillate to one side of radial lines extending from the axes of oscillation of said bell crank members and perpendicular to the average longitudinal center line of said connecting link, said connecting link being so arranged as to be intermediate the axes of oscillation of said bell crank members and said lever arm of said second bell crank member having connection with said driven member being so disposed with respect to said other lever arm as to oscillate at equal angles to a radial line extending through the axis of oscillation of said bell crank member and perpendicular to the longitudinal center line of said driven member.

16. In a shaker conveyer operating mechanism, a conveyer trough, means for reciprocably moving said conveyer trough comprising a driven member disposed beneath said conveyer trough and reciprocably movable in a plane coincident with the longitudinal axis of said conveyor trough, a housing having a reduced portion extending beneath said conveyer trough, a guide in said reduced portion of said housing for guiding said driven member in a plane coincident with the longitudinal axis of said conveyer trough, and drive mechanism mounted in said housing for driving said driven member including a motor supported by said housing, a rotatable member driven thereby, and a connecting member reciprocably movable in a horizontal plane extending into said reduced portion of said housing and having connection with a bell crank member mounted in said reduced portion of said housing for pivotal movement about a vertical axis intersecting said conveyer trough, and said bell crank member having connection with said driven member.

17. In a shaker conveyer operating mechanism, a conveyer trough, means for reciprocably moving said conveyer trough comprising a driven member disposed beneath said conveyer trough and reciprocably movable in a plane coincident with the longitudinal axis of said conveyer trough, a housing having a reduced portion extending beneath said conveyer trough, a guide in said reduced portion of said housing for guiding said driven member in a plane coincident with the longitudinal axis of said conveyer trough, and drive mechanism mounted in said housing for driving said driven member including a motor supported by said housing, a rotatable member driven thereby, a bell crank member oscillated by said rotatable member about a vertical axis, another bell crank member mounted in the reduced portion of said housing for oscillation about a vertical axis, an operative connection between said bell crank members, and a connection between said last mentioned bell crank member and said driven member.

18. In a shaker conveyer operating mechanism, a conveyer trough, and drive mechanism for reciprocably driving said conveyer trough comprising a housing, a reduced portion of which extends beneath said conveyer trough, an elongated guide in said reduced portion of said housing disposed in a horizontal axis but in a vertical plane which also includes the longitudinal axis of said conveyer trough, a plunger slidable in said guide, a connection between said plunger and conveyer trough, and means for reciprocably moving said plunger including a motor, a bell crank member driven thereby, a second bell crank member pivoted in said reduced portion of said housing, a connecting member connecting said bell crank members together, and a connection from said last mentioned bell crank member to said plunger.

19. In a shaker conveyer operating mechanism, a conveyer trough, and drive mechanism for reciprocably driving said conveyer trough comprising a housing, a reduced portion of which extends beneath said conveyer trough, an elongated guide in said reduced portion of said housing disposed in a horizontal axis but in a vertical plane which also includes the longitudinal axis of said conveyer trough, a plunger slidable in said guide, a connection between said plunger and conveyer trough and means for reciprocably moving said plunger including a motor, a bell crank member driven thereby, a second bell crank member pivoted in said reduced portion of said housing, a connecting member connecting said bell crank members together, said connecting member having its longitudinal axis disposed intermediate the axis of pivotal movement of said bell crank members and extending into said reduced portion of said housing, and a connection from said last mentioned bell crank member to said plunger.

WILLIAM W. SLOANE.